United States Patent [19]

Coffield

[11] Patent Number: 5,426,785
[45] Date of Patent: Jun. 20, 1995

[54] COMPARATOR STACK ARCHITECTURE FOR ORDER STATISTIC FILTERING OF DIGITAL IMAGERY

[75] Inventor: Patrick C. Coffield, Shalimar, Fla.

[73] Assignee: The United States of America as represented by the Secretary of the Air Force, Washington, D.C.

[21] Appl. No.: 37,152

[22] Filed: Mar. 25, 1993

[51] Int. Cl.⁶ .......................... G06F 15/66; G06F 7/06
[52] U.S. Cl. ................................ 395/800; 364/604; 364/DIG. 1
[58] Field of Search .......................... 395/800; 364/604

[56] References Cited

U.S. PATENT DOCUMENTS 5,262,968 11/1993 Coffield .............................. 364/604

OTHER PUBLICATIONS

Aki, Selim G., *Parallel Sorting Algorithms*, Chapter 2, pp. 17–39, Academic Press, 1985.
Knuth, Donald E., *The Art of Computer Programming*, vol. 3, *Sorting and Searching*, pp. 111–114 and 220–246, Addison-Wesley, 1973.
Roth, C. H., *Fundamentals of Logic Design*, West Publishing Co., The 2nd. Edition 1979, at pp. 369–371; or the 3rd Edition, 1985, pp. 400–403.
Coffield, Patrick C. "An Electro-Optical Image Processing System For Automatic Target Recognition", Presented to the Graduate School of the University of Florida in partial fulfillment of the requirements for the degree of Doctor of Philosophy, University of Florids, Aug. 1992.
Coffield, Patrick C. "An Architecture for Processing Image Algebra Operations", Presented to the Image Algebra and Mathematical Image Processing Conference of the SPIE International Symposium on Optical Applied Science and Engineering, 19–24 Jul. 1992, San Diego, California, to be published in the Conference Proceedings vol. No. 1769—Image Algebra and Morphological Image Processing III.

*Primary Examiner*—Alyssa H. Bowler
*Assistant Examiner*—Denise Tran
*Attorney, Agent, or Firm*—Bernard E. Franz; Thomas L. Kundert

[57] ABSTRACT

This is a circuit design for determining the order statistics of an arbitrary (length and value) string of numbers as the string is acquired. The circuit is intended for use with a system covered by my copending application titled "A High Performance Architecture for Image Processing", Ser. No. 07/904,315, filed Jun. 25, 1992. This circuit can be connected to each of the fine grain computational cells of that system to provide the desired filtering action (e.g., median filter). The configuration of the circuit is based upon the notion of a stack operation using comparator circuits as positions in the stack. Each comparator circuit has a counter connected to its output line that indicates a "greater than" condition. A hardware pointer indicates the top position of the stack. Then, as a string value is "pushed" onto the top of the stack, the top value is simultaneously compared to the remaining values in the stack. At this time two control conditions are automatically invoked such that the appropriate counters are incremented. The result is the counters now contain the order statistics as the string is read in. Other known procedures used for obtaining the order statistics require the entire string to be known before the sorting action can begin and in most cases the length of the string must be fixed. This design eliminates such requirements.

11 Claims, 4 Drawing Sheets

COMPARATOR STACK ARCHITECTURE FOR ORDER STATISTIC FILTERING OF DIGITAL IMAGERY

RIGHTS OF THE GOVERNMENT

The invention described herein may be manufactured and used by or for the Government of the United States for all governmental purposes without the payment of any royalty.

CROSS REFERENCE TO RELATED APPLICATION

This invention is intended for use with a system covered by my copending application titled "A High Performance Architecture for Image Processing", Ser. No. 07/904,315, filed Jun. 25, 1992, now U.S. Pat. No. 5,262,968, issued Nov. 16, 1993, referred to hereinafter as my *Image Processing patent application*, and hereby incorporated by reference.

BACKGROUND OF THE INVENTION

The present invention relates generally to fast parallel sorting of a numerical string, and more particularly to a comparator stack architecture for order statistic filtering of digital imagery.

There are many examples of circuit designs that can be used for sorting and deriving the desired order statistic (e.g., Batcher's odd-even merge sort for parallel circuit design, (see references 1 and 2 below)). However, most all of these methods require the entire string of numbers to be known a priori. Also, most circuit designs related to these methods are for a fixed string length, usually a power of 2. No known design has been built using a comparator stack configuration which allows the sorting of the string to occur automatically as each string value is "pushed" onto the stack.

REFERENCES:
1. Akl, Selim G., *Parallel Sorting Algorithms*, Academic Press, 1985. See particularly chapter 2, pages 17–39.
2. Knuth, Donald E., *The Art of Computer Programming*, Vol. 3, *Sorting and Searching*, Addison-Wesley, 1973. See particularly pages 111–114 and 220–246.
3. Roth, C. H., *Fundamentals of Logic Design*, West Publishing Co. 1979, either the second edition at pages 369–371, or the third edition at pages 400–403.

Akl and Knuth show parallel sorting, including Batcher's odd-even merge sort for parallel circuit design. Roth shows a typical comparator circuit.

SUMMARY OF THE INVENTION

An objective of the invention is to provide a method and apparatus for order statistic filtering of digital imagery (i.e. in image processing for automatic target recognition).

More generally, an objective is to provide a method and circuit for fast sorting or order statistics of a numerical string.

The invention relates to a circuit design for determining the order statistics of an arbitrary (length and value) string of numbers as the string is acquired. The circuit is intended for use with the system covered by my *Image Processing patent application*. This circuit can be connected to each of the fine grain computational cells of that system to provide the desired filtering action (e.g., median filter). The configuration of the circuit is based upon the notion of a stack operation using comparator circuits as positions in the stack. Each comparator circuit has a counter connected to its output line that indicates a "greater than" condition. A hardware pointer indicates the top position of the stack. Then, as a string value is "pushed" onto the top of the stack, the top value is simultaneously compared to the remaining values in the stack. At this time two control conditions are automatically invoked such that the appropriate counters are incremented. The result is the counters now contain the order statistics as the string is read in. Other known procedures used for obtaining the order statistics require the entire string to be known before the sorting action can begin and in most cases the length of the string must be fixed. This design eliminates such requirements.

A copy of the circuit described herein can be connected to n output values of the fine grain computational cells of the system shown in my *Image Processing patent application* to provide the i-th smallest value (order statistic).

Many image processing tasks require order statistic filtering; for instance, a median filter to remove impulse noise spikes from an image. In this instance, the output of the filter at each pixel is the n/2 smallest value of an n kernel filter applied to the respective n image pixel values.

Scope of the Invention

The circuit can be applied to any situation where the numerical string is gathered one value at a time or where the length of the numerical string is undetermined within a fixed upper bound. The circuit is intended for use where image processing requirements may include order statistic filtering. ("Median" is clearly defined as being the value of a middle item in a series containing n items if n is an odd number, e.g. the numerical value of item $(n+1)/2$ when the items have been assigned order statistics from 1 to n. In a series containing an even number of items, there are two middle numbers, e.g. $n/2$ and $(n+2)/2$ in the order statistics, with the value of either being defined as the median, or a numerical value may be interpolated between the values of the two middle items and defined as the median.)

ADVANTAGES OF THE INVENTION

1. For applications where the string values are derived serially, this is the fastest computational method for generating the order statistics, O(n). The merit of this conceptual design is its simplicity. As n numbers are individually input into the circuit, they are sorted for their order in the string. This allows strings of arbitrary lengths (within the physical upper bound of the stack) to be processed in the same circuit.
2. The simplicity of the design allows the physical implementation (VLSI, brass board, etc.) to have widespread application.
3. No other known device or design has made this claim of using a comparator stack to gather order statistics.

DETAILED DESCRIPTION

The invention is disclosed in chapter 5 of a dissertation titled "An Electro-Optical Image Processing System For Automatic Target Recognition" by Patrick C. Coffield, presented to the graduate school of the University of Florida in partial fulfillment of the requirements for the degree of Doctor of Philosophy, University of Florida, 1992. The dissertation is hereby incorporated by reference, and a copy is enclosed with this patent application as filed.

The invention is also disclosed in a paper presented under the title "An Architecture for Processing Image Algebra Operations" to the Image Algebra and Mathematical Image Processing Conference of the SPIE International Symposium on Optical Applied Science and Engineering, 19–24 Jul. 1992, San Diego, Calif. The presentation will be published in the conference proceedings Volume Number 1769—Image Algebra and Morphological Image Processing III. The paper is hereby incorporated by reference, and a copy is enclosed with this patent application as filed.

There are many different ways of computing the i-th smallest value from a string of n numbers (see reference 2). The string is first sorted from smallest to largest then the value at the i-th smallest position is selected. If the median value is called for, then the nearest middle ([n/2]) position is selected.

Using a sequential computer (i.e., single CPU), the fastest known method of sorting has run time complexity of $O(n \log_2 n)$. The odd-even merge sort mentioned under BACKGROUND has run time complexity $O(\log_2 (2n))$. While the odd-even merge sort is a very fast parallel network of cross-coupled comparator circuits, the entire fixed length string of numbers must be available before processing.

Figure 1:
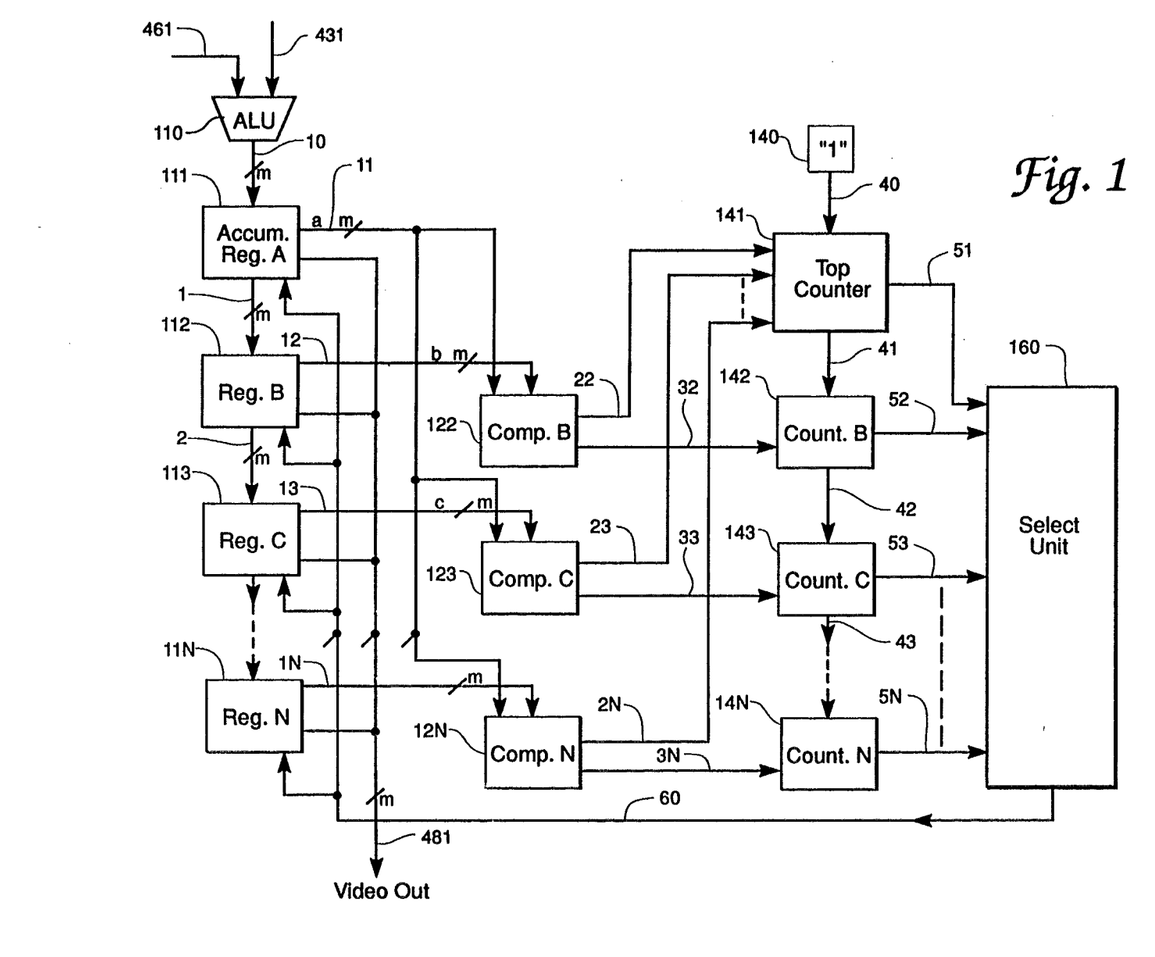
FIG. 1 is a block diagram showing a stack of registers, with comparators and counters, for sorting a string of numbers.
Figure 2:
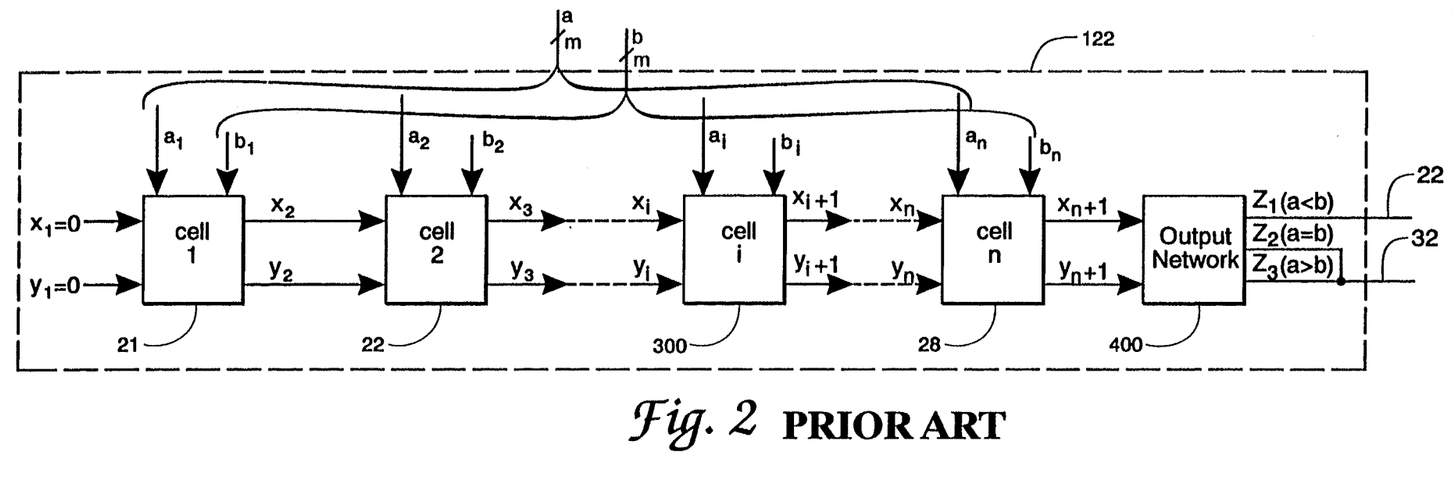
FIG. 2 is a block diagram of one comparator.

The comparator stack concept described herein has run time complexity $O(n)$. Using the design of a comparator circuit as shown in FIG. 1 (see reference 3 (Roth)), an arbitrary length stack can be arranged as shown in FIG. 2, such that the value that is "pushed" onto the top of the shack (determined by a hardware pointer) can be simultaneously compared to all lower values in the stack. A counter, initialized to zero, is connected to the "greater than" output of each comparator. As a number is "pushed" onto the stack, the following two control conditions will be automatically invoked:

1. The counter connected to the top of the stack is incremented.
2. If the value at the top of the stack is "less than" the j-th value in the stack, then increment the counter connected to the top of the stack (the "less than" or the "equal to" output of the j-th comparator goes high). Otherwise, increment the counter connected to the j-th value (the "greater than" output of the j-th comparator goes high).

Immediately after each number is "pushed" onto the stack the counter values contain the sorted order, thus $O(n)$ time complexity.

USE OF THE INVENTION

The impact that this invention, when incorporated into the system covered by my *Image Processing patent application* will have on the image processing community will be substantial. The immediate application will be for military use. The image processing community, however, includes much more than DoD interests; such as: Medical imaging, MRI, blood analysis, cancer research; NASA interests; real-time satellite reconnaissance for NOAA and EPA; manufacturing robotics; speech recognition; and, university level instructional aid to name a few. The physical implementation of the invention can be made available to the low price level, personal computer as well as the workstation market.

Figure 5:
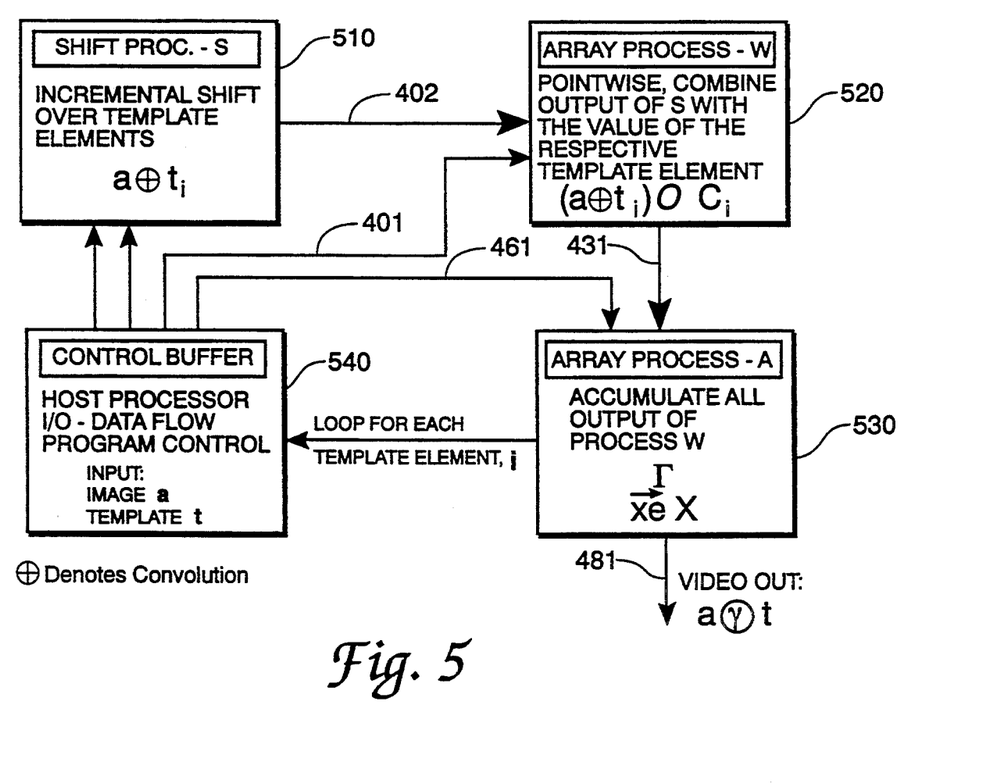
FIG. 5 is a block diagram of a high performance architecture for image processing, as disclosed in the related patent application.

THE UNIT SHOWN IN FIG. 1 MAY BE USED AS THE ACCUMULATION PROCESSOR 530 OF FIG. 5, which is a block diagram of A HIGH PERFORMANCE ARCHITECTURE FOR IMAGE PROCESSING, as disclosed in the related patent application.

EXEMPLARY EMBODIMENT

FIG. 1 is a block diagram of an order statistic using stacked registers with parallel comparators. An arithmetic logic unit 110 forms a string of numbers, with each number comprising m binary bits output in parallel on line 10. There are N registers 111–11N. The first register is used as an accumulator, and is also designated as register A. The registers 111–11N are arranged in a stack, with register 111 having an input from line 10 and an output on line 1 to an input of register 112 (register B), register 112 having an output on line 2 to an input of register 113, and so on down to register 11N having an input from the preceding register (not shown).

There are (N−1) comparators 122–12N. These comparators are of a type which can compare two m-bit numbers in parallel, with outputs which indicate whether the first number is less than, equal to, or greater than the second number. An output from the accumulator register 111 on line 11 is connected to supply the first m-bit number a to all of the comparators 122–12N. Each of the other registers 112–11N has an output connected to one of the comparators, with register 112 having an output on line 12 to supply the second input number b to comparator 122, register 113 connected to supply the second input number c to register 123, and so on down to register 11N connected to supply the second input number to comparator 12N. The outputs of the comparators 122–12N are connected so that each has a first output (22–2N respectively) which goes high if the first input number has a value less than that of the second input number, and a second output (32–3N respectively) which goes high if the first number has a value which is equal to or greater than that of the second input number.

There are N counters 141–14N. The first counter 141 is designated as a top counter, and has (N−1) inputs on the leads 22–2N from the comparators 122–12N. The counters are shown as being connected in a stack arrangement, with the top counter having an output in parallel on line 41 to counter 142, counter 142 having an output on line 42 to counter 143, and so on down to an output on from the penultimate counter (not shown) to the last counter 14N. Each of the counters 142–14N needs to have a circuit which disables its counting input at the left as long as the value stored in the counter is zero. The respective outputs from the N counters are shown connected via lines 51-5N to a select unit 160. These are multiconductor lines which supply the count values in parallel.

For the order statistical filtering function, a select unit 160 looks at the values stored in the N counters 141-14N, and supplies an address on line 60 to select one of the registers 111-11N. The selected register will then supply the value of the number stored therein to an m-bit video output line 481.

To properly synchronize the operation of the units shown in FIG. 1, it is necessary to provide timing signals from a clock (not shown) to the ALU 110, the registers 111-11N, the counters 141-14N, and the select unit 160.

In operation, the arithmetic logic unit 110 supplies a string of digitized binary coded numbers on line 10 to the accumulator register 111. Each number comprises m bits in parallel. As each number of a string is received, the previous number is pushed down via line 1 to the register 112, and in like manner, the number in each register is pushed down to the one below it.

Demonstration of Principle

Figure 6:
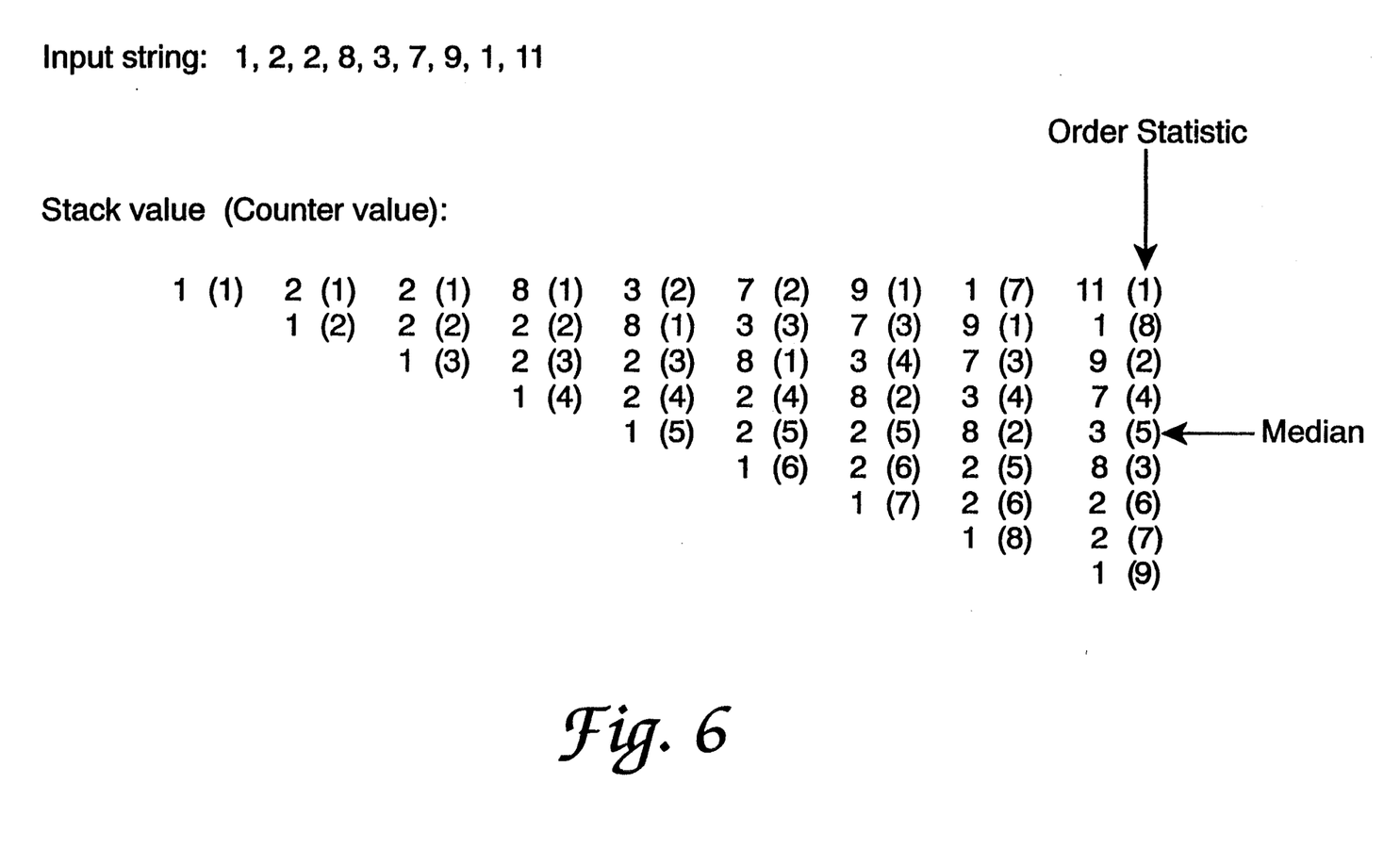
FIG. 6 is chart showing an example of comparator stack operation.

FIG. 6 demonstrates the function of the invention by processing an arbitrary string, in this instance, the string: 1, 2, 2, 8, 3, 7, 9, 1, 11.

Before the start of each string, all of the registers and counters are cleared to a value of zero.

For each value "pushed" onto the stack:
1. increment the top counter
2. if the top value is less than the j-th value increment the top counter
   else
   increment the j-th counter The first operation of incrementing the top counter means that it is reset to a value of "1" for each value pushed onto the stack. This is shown symbolically in FIG. 1 by the value "1" from a block 140 being loaded in parallel into the top counter 141 via a multiconductor line 40.

The top row of the table in FIG. 6 shows the value stored in the accumulator register 111, and in parentheses the value in the top counter 141 after the comparison and incrementing of the counters; the second row shows the value in register 112, and the counter value in counter 142, and so on down for the other registers and their associated counters. The first column shows the values stored after the first number is pushed onto the stack, the second column after the second number, and so on across.

Referring to the first column of FIG. 6, the first number of the string has a value of "1", and the counter 141 is loaded to a value of "1". The leads 22-2N from the comparators are all low, so that the counter 141 remains at a value of "1".

As shown in the second column, the next number in the string has a value of "2", and the value of "1" is pushed down to register 112. The top counter is again loaded with a value of "1", and the previous value of "1" is pushed down from the counter 141 to counter 142. The comparator 122 finds that the number a on the line 11 from the register 111 is greater than the number b on the line 12 from the register 112, so the signal on line 22 is low and the signal on line 23 is high. Therefore the value in counter 142 is incremented to a value of "2", while the value in the top counter 141 remains at "1".

Referring to the third column, the next number loaded into the accumulator register 111 is again a "2", the previous value of "2" is pushed down to register 112, and the value of "1" is pushed down to register 113. Again the top counter 141 is loaded with a "1", and the values of "1" and "2" from registers 141 and 142 are pushed down to registers 142 and 143 respectively. Since the value in the accumulator register 111 is equal to the value in register 112 and greater than the value in register 113, the signals on leads 22 and 23 from the comparators 122 and 123 are low, and the signals on leads 32 and 33 are high. Therefore the value in the top counter 141 remains at a value of "1", and the counters 142 and 143 are incremented to values or "2" and "3" respectively, as shown in the parentheses of the third column.

The fourth column shows a value of "8" loaded into the register 111, and the values from the third column each pushed down one row. The counter values from the third column are each pushed down, and then incremented by the signals from the first three comparators, while the value in the top counter remains at a value of "1".

As shown in the fifth column, the stack values in the first four of the registers and the first four of the counters are pushed down one row, and a value of "3" is loaded into the register 111. Since the top value of "3" is less that the value of "8" in register 112, the output of comparator 122 is high on lead 22 and low on lead 32. The value of "3" is less than each of the other stack values in rows 3, 4 and 5, so the top counter 141 is incremented by one to a value of "2", the count value in the second row is not incremented and remains "1", and the count values in rows 3, 4 and 5 are each incremented to values of "3", "4" and "5" respectively.

The stack value of "7" loaded at the top of the sixth column is less than one other value, e.g. the value of "8" in the third row, so that the count value at the top is incremented to a value of "2", the count value associated with the stack value of "8" remains at a value of "1", and the other values pushed down from the fifth column are each incremented by one.

The next stack value of "9" is greater than any of the values below it, so the top counter remains at a value of "1", and each of the other count values pushed down from the preceding column are each incremented by one.

In the eighth column the top stack value having a value of "1" is less than six other values, so the value in the top counter is incremented to "7", and the next six values are greater than the top value so that the counter values are each incremented by one. The last stack value is equal to the top value, so its counter value is also incremented by one.

In the last column, the top stack value of "11" from the input string is greater than all the other values below it, so the top counter retains a value of "1", while the other counter values pushed down from column eight are all incremented by one.

The stack values in the last column are now ranked from the largest number to the smallest, with order statistic values from "1" to "9". Note that the stack values could be ranked from the smallest to the largest by connecting the "greater than" outputs of the comparators to the top counter 141, and the "lesser than" outputs to the respective counters 142-14N. The "equal to" outputs can be connected to either the top counter, or the respective ones of the other counters, since it does not matter in which order equal numbers are ranked.

After the last number in the string has been pushed onto the register stack and ranked in the counters, the select unit 160 in FIG. 1 then selects a predetermined i-th order statistic value. For median filtering, the counter value selected will be the median value, which can be determined by adding one to the maximum rank value and dividing by two. In the example shown in FIG. 6, the median counter value is $(9+1)/2=5$. The median stack value for this counter value is "3". The address of the register corresponding to counter is forwarded via a line 60 to all of the registers 111–11N to select the one addressed and supply the value from that register to the video output line 481.

If the maximum value stored in the counters is an even number, the value obtained by adding one and dividing by two can be either truncated or rounded up. For example in the eighth column, either counter value of "4" or "5" may be selected, to give a median stack value of "3" or "2".

Design of a Comparator

Figure 3:
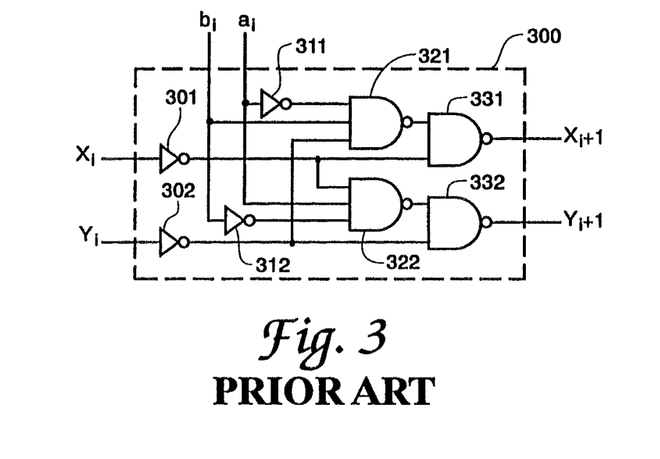
FIG. 3 is a functional block diagram of one cell of the comparator of FIG. 2.
Figure 4:
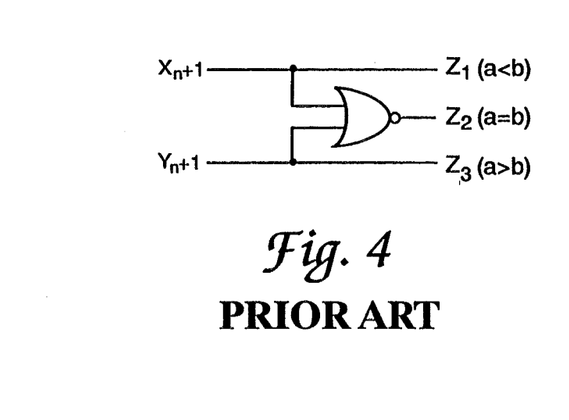
FIG. 4 is a functional block diagram of an output network for the comparator of FIG. 2.

The design of a comparator as shown in FIG. 2 is taken from Roth, "Fundamentals of Logic Design" section 18.2 of the second edition at pages 369–371, or the third edition at pages 400–403. If the numbers to be compared each have n bits, there are n cells 21–28. The most significant bits $a_1$ and $b_1$ of each of the numbers a and b is connected to the first cell 21, and the succeeding bits to the other cells down to the least significant bits $a_n$ and $b_n$ connected to the n-th cell 28. A typical cell 300 for the i-th bit is shown in FIG. 3. An output network 400, which is connected following the n-th cell, is shown in FIG. 4. Comparison in FIG. 2 proceeds from left to right. The first cell 21 compares $a_1$ and $b_1$ and passes the result on leads $x_2$ and $y_2$ to the next cell 22, etc. Finally, $x_n$ and $y_n$ are compared by the last cell 28, and the output network 400 produces signals to indicate if $a<b$, $a=b$, or $a>b$ on leads Z1, Z2 and Z3 respectively.

A truth table for a typical comparator cell is as follows:

| $x_i$ | $y_i$ | \multicolumn{4}{c}{$a_i b_i =$} | $z_1$ | $z_2$ | $z_3$ | |
|---|---|---|---|---|---|---|---|---|---|
| | | 00 | 01 | 11 | 10 | | | | |
| 0 | 0 | 00 | 10 | 00 | 01 | 0 | 1 | 0 | (a < b) |
| 0 | 1 | 01 | 01 | 01 | 01 | 0 | 0 | 1 | (a = b) |
| 1 | 0 | 10 | 10 | 10 | 10 | 0 | 0 | 1 | (a > b) |

The inputs to the left of the first cell must be $x_1 = y_1 = 0$.

In the circuit shown in FIG. 3, the input on lead $a_i$ is connected via an inverter 311 to an input of a NAND gate 321, and directly to an input of a NAND gate 322. The input on lead $b_i$ is connected via an inverter 312 to an input of the NAND gate 322, and directly to an input of the NAND gate 321. The outputs of the NAND gates 321 and 322 are connected respectively to inputs of NAND gates 331 and 332. The input on lead $x_i$ is connected via an inverter 301 to inputs of NAND gates 322 and 331, and the input on lead $Y_i$ is connected via an inverter 302 to inputs of NAND gates 321 and 332. The outputs of the gates 331 and 332 are designated $x_{i+1}$ and $y_{i+1}$ respectively.

The output network shown in FIG. 4 has the input lead $x_{n+1}$ connected directly to the output lead $Z_1$ and also to an input of a NOR gate, and the input lead $y_{n+1}$ connected directly to the output lead $Z_3$ and also to an input of the NOR gate. The output of the NOR gate is the output lead $Z_2$. Note that the output lead $Z_2$ may be connected either to lead 32 as shown in FIG. 2, or to lead 22, since as noted above in the section "Demonstration of Principle" it does not matter in which order equal numbers are ranked.

COMPUTER PROCESSING

The invention may be implemented in a digital computer, which could be one having a single processor with sequential operation, but preferably is one having a parallel processor architecture. The registers and counters of FIG. 1 may be separate registers, or designated memory locations. There must be some method or means for pointing to the last number which has been received as the top number at any time during the processing of a string. Also, the top counter needs to be specifically identified and associated with the top number, and then each count value needs to be kept associated with its individual number of the string. Each number of a string may be left in one memory location or processor, or the numbers may be shifted to different memory locations or processors as they are received. The same is true of the count values.

The comparison operations may be done with software; but when a parallel processor architecture is used, it is preferred that each processor include a hardware comparator as in FIG. 2 for speed of operation.

THE ARCHITECTURE FOR IMAGE PROCESSING

FIG. 5 is a block diagram of a high performance architecture for image processing, as disclosed in the related patent application.

The logical computer architecture is specifically designed for image and signal processing, and other related computations. As shown in FIG. 5, the architecture is a data flow concept comprising three tightly coupled components: a spatial configuration processor 510 (process S), a weighting processor 520 using a point-wise operation (process W), and a accumulation operation processor 530 (process A). The data flow and image processing operations are directed by the control buffer 540 and pipelined to each of the three processing components.

The spatial configuration process is a step-wise discrete convolution of the original input image with each template location. A unit value is assigned to the template element for each convolution. The result of each convolution is simply a shift of the input image element.

The output of the spatial configuration processor is combined point-wise in the weighting processor 520, using the appropriate binary associative operator from the algebraic set of operators, with the value of the respective template element. This point-wise operation processor 520 is a typical array processor execution with the binary associative operators assigned to each arithmetic logic unit.

The output of the point-wise operation process is now accumulated point-wise, using the appropriate global reduce operator from the algebraic set of operators. Once the final template element is processed in this fashion, the accumulator memory contains the result of the generalized matrix product defined in the algebra. Note, the generalized matrix product is the mathematical formulation for operations such as: general convolution/correlation, additive maximum/minimum, and multiplicative maximum/minimum. These operations along with the direct image-to-image (strictly a pointwise process) unary and binary operations allow for the formulation of all common image processing tasks. Hence, this architecture will control the execution of all necessary operations of the underlying image algebra.

For the hybrid electro-optical embodiment, the spatial configuration processor 510 is a Fourier optical correlator design using binary and high resolution ($2^8$ bits) spatial light modulator technology (e.g. Ferroelectric Liquid Crystal, Smectic A-FLC) and a charged coupled device (CCD) array to provide the output image in digital form, with a high frame switching frequency. It provides a step-wise optical convolution of the original input image with each template location.

The weighting processor 520 is a parallel array processor with directly connected input from the CCD array of the spatial configuration processor 510, and with the capability to load a scalar value to each arithmetic logic unit (ALU). Three parallel shift registers are needed for each ALU. Each ALU must have a multiplier, an adder, and a modified comparator. The output image will be the result of combining the input image with the scalar using one of the following operations: +; ·; <; >; (AND); and (OR).

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A comparator stack architecture for order statistic filtering of digital imagery, comprising:

an arithmetic logic unit (ALU) which generates strings of numbers having positive numerical values which represent the digital imagery, with the numbers appearing in sequence at an output of the ALU;

a plurality of stack units designated as a first stack unit, then a second stack unit, and succeeding stack units to an Nth stack unit, N being an integer greater than one;

wherein the first stack unit comprises an accumulator register having an input coupled to the output of the ALU, and a first counter;

wherein the second to N-th stack units each comprises a stack register, a comparator, and a stack counter, with the second stack register having an input coupled to an output of the accumulator register, each of the other stack registers having an input coupled to an output of a preceding stack register, with the second stack counter having an input coupled to an output of the first counter, and each of the other stack counters having an input coupled to an output of a preceding stack counter;

wherein each comparator has a first number input and a second number input, the accumulator register having an output coupled to the first number input of each of the comparators, each of the stack registers having an output coupled to the second number input of the comparator in the same stack unit, each comparator unit having means for comparing numerical values at its first and second number inputs, and for indicating whether the numerical value at the first number input is less than, equal to or greater that the numerical value at the second number input, each comparator having first and second outputs, with one having an active value for the less-than condition and the other having an active value for the greater-than condition, and the equal to condition providing an active value on one of the first and second outputs;

wherein said first counter has (N−1) inputs coupled respectively to the first output of the comparator of each of said stack units, each stack counter having an input coupled to the second output of the comparator of the same stack unit;

means effective before the start of each said string for setting the accumulator register and each stack register to a value of zero, and for setting the first counter and each stack counter to a count value of zero;

stacking means operative as a number is loaded from the ALU via the output of the ALU into the accumulator register for substantially simultaneously moving any number stored in the accumulator register into the stack register of the second stack unit, and any number stored in any of the stack registers except the last into the succeeding stack register, and for moving any count value stored in the first counter into the stack counter of the second stack unit, and any count value stored in any of the stack counters except the last into the succeeding stack counter, and means for then setting the first counter to a count value of one;

counting means operative following operation of the stacking means for each number of a string for incrementing the first counter by the number of its inputs having an active value, and for incrementing each stack counter by one in response to the count value therein being greater than zero and its input being active;

whereby sorting of a string occurs automatically as each number is "pushed" onto the stack, so that when n numbers of a string have been pushed onto the stack, the counters have count values which are the order statistic for the numerical values stored in the registers, with count values from one to n, n being a positive integer not greater than N;

select means coupled to the first counter and each of the stack counters, a control line coupled from the select means to each of the registers, the select means being operative following the end of a string to identify one of the stack units whose counter has an i-th smallest count value of the order statistics and via said control line to enable the register of that stack unit to supply the numerical value therein to a video output line, to thereby provide a filtered output for the digital imagery represented by the input string from the ALU, i being a positive integer less than n.

2. The comparator stack architecture according to claim 1, wherein said i-th smallest count value is a middle value between one and n, so that the numerical value on the video output line is a median value.

3. The comparator stack architecture according to claim 1, wherein the numerical values are coded on m parallel leads at the inputs and outputs of the registers, and at the inputs of the comparators; and the count values are coded on parallel leads at the inputs and outputs of the counters, m being a positive integer;

and wherein the comparators are of a type which can compare two m-bit numerical values in parallel.

4. The comparator stack architecture according to claim 3, wherein for each of said comparators, the first output becomes active in response to the numerical value at the first number input being less than the numerical value at the second number input, and the second output becomes active in response to the numerical value at the first number input being greater than or equal to the numerical value at the second number input.

5. The comparator stack architecture according to claim 1, used as an accumulation processor of a logical computer architecture for image and signal processing, using a data flow concept for performing operations of an image algebra having an algebraic set of operators;

wherein the logical computer architecture comprises three tightly coupled processing components: a spatial configuration processor (process S), a weighting processor using a point-wise operation (process W), and said accumulation processor (process A), wherein the data flow and image processing operations are directed by a control buffer and pipelined to each of said three processing components;

wherein the spatial configuration processor has an input for an original image and an input for a template, and in operation uses a step-wise discrete convolution of the original input image with each template location, with a unit value assigned to the template element for each convolution, the result of each convolution being a shift of the input image element, providing an output of the spatial configuration processor which is coupled to the weighting processor;

wherein the output of the spatial configuration processor is combined point-wise in the weighting processor, using an appropriate binary associative operator from the algebraic set of operators, with the value of the respective template element, the operation of the weighting processor being an array process execution with the binary associative operators assigned to each of a plurality of arithmetic logic units, the weighting processor having an output coupled to the accumulation processor;

wherein the output of weighting processor is accumulated point-wise in the accumulation processor, using an appropriate global reduce operator from the algebraic set of operators, so that, once the final template element is processed, the accumulation processor contains the result of a generalized matrix product defined in the image algebra.

6. A method of sorting a string of numbers which are supplied sequentially, wherein each number has a numerical value which is digitally encoded, using an arrangement of stack units including a top register and a plurality of other registers, a top counter and a plurality of other counters, the top counter being associated with the top register, each other counter being associated with one of the other registers, said method comprising the following steps:

(a) at the beginning of a string, setting numerical values in the top register and in all of the other registers to zero, and setting count values in the top counter and in all of the other counters to zero;

(b) as a first number is supplied in the string, pushing it into the top register and setting the top counter to a count value of one;

(c) as a next number is supplied in the string, pushing it into the top register and resetting the top counter to a count value of one, while pushing numerical values in the registers and count values in the counters down in the stack arrangement;

(d) for each other register, comparing the numerical value in said other register to said next numerical value in the top register, with a result of the comparison for each said other register being either a given first condition or a different given second condition being true, each condition being selected from the numerical value in the top register being less than, equal to, or greater than the numerical value in each said other register, one of the conditions being true for less than, the other being true for greater than, and equal to being included in one and only one of the two conditions;

(e) incrementing the top counter by a value equal to the total number of other registers for which said comparison results in the first condition being true, and incrementing each other counter for which the result of the comparison for its associated register is the second condition being true while the count value in that counter is greater than zero;

(f) repeating steps (c) to (e) for each number supplied from the string, until the end of the string;

whereby after n numbers of a string have been pushed onto the stack arrangement, n being a positive integer not greater than N, the counters have counter values from one to n which indicate ranking of the numerical values in the associated registers.

7. The method according to claim 6, further including the step, following the end of a string, of selecting an i-th smallest count value of order statistics, identifying one of the of stack units whose counter is storing said i-th smallest count value, and enabling the register of said one of the stack units to supply the numerical value therein to a video output line, to thereby provide a filtered output for digital imagery represented by the input string.

8. The method according to claim 6, further including the step, following the end of a string, of selecting a middle value between one and n of the order statistics, identifying the stack unit whose counter is storing said middle value, and enabling the register of that stack unit to supply the numerical value therein to a video output line, so that the numerical value on the video output line is a median value, to thereby provide a filtered output for digital imagery represented by the input string.

9. A method, using a parallel processor architecture having a plurality of processors, of sorting a string of numbers which are supplied sequentially, wherein each number has a numerical value which is digitally encoded, said method comprising the following steps:

(a) at the beginning of a string, clearing all of the processors to begin processing of a string;

(b) as a first number is supplied in the string, storing it in one of the processors and setting a top counter to a count value of one;

(c) as a next number is supplied in the string, storing it in one of the processors and pointing to designate it as a top number, while any number previously designated as a top number is now designated as a non-top number, storage of numbers of the string being organized so that each number is in a separate one of said processors and has an associated count value, with the count value from the top counter becoming associated with an immediately previous top number, and resetting the top counter to a count value of one;

(d) for each number of the string which has been stored and is not a top number, comparing its numerical value to the numerical value of the top number, with a result of the comparison for each said non-top number being either a given first condition or a different given second condition being true, each condition being selected from the numerical value of the top number being less than, equal to, or greater than the numerical value of said each number of the string which has been stored and is not a top number, one of the conditions being true for less than, the other being true for greater than, and equal to being included in one and only one of the two conditions;

(e) incrementing the top counter by a value equal to a total number of non-top numbers for which said comparison results in the first condition being true, and incrementing the count value associated with each non-top number for which the result of a comparison for its associated register is the second condition being true if a previous count value for that number was greater than zero;

(f) repeating steps (c) to (e) for each number supplied from the string, until the end of the string;

whereby after n numbers of a string have been stored, n being a positive integer not greater than N, the count values for the n numbers range from one to n which indicate the rank of the numerical values in the associated registers.

10. The method according to claim 9, further including the step, following the end of a string, of selecting an i-th smallest count value of order statistics, identifying one of the numbers whose count value is said i-th smallest count value, and outputting said one of the numbers to a video output line, to thereby provide a filtered output for digital imagery represented by the input string.

11. The method according to claim 9, further including the step, following the end of a string, of selecting a middle value between one and n of the order statistics, identifying the number whose count value is said middle value, and outputting that number to a video output line, so that the numerical value on the video output line is a median value, to thereby provide a filtered output for digital imagery represented by the input string.

* * * * *